Patented Feb. 12, 1924.

1,483,155

UNITED STATES PATENT OFFICE.

JAMES BOYCE, OF HOLLAND, MICHIGAN, ASSIGNOR TO THE AMERICAN COTTON OIL COMPANY, OF NEW YORK, N. Y., A CORPORATION OF NEW JERSEY.

FOOD PRODUCT AND MANUFACTURE THEREOF.

No Drawing. Application filed June 1, 1914, Serial No. 842,281. Renewed June 22, 1923.

*To all whom it may concern:*

Be it known that I, JAMES BOYCE, a citizen of the United States, residing at Holland, county of Ottawa, State of Michigan, have invented certain new and useful Improvements in Food Products and Manufacture Thereof; and I do hereby declare the following to be a full, clear, and exact description of the invention, such as will enable others skilled in the art to which it appertains to make and use the same.

My invention relates to certain new and useful improvements in food products and particularly to the preparation or manufacture from a vegetable oil, (such as cotton-seed oil) of an oil having superior qualities for edible uses.

In the preferred practice of my invention, the cotton-seed oil is first refined by any of the approved methods until it has the quality of what is known to the trade as " prime summer oil." I then hydrogenate the oil up to preferably a point where it just becomes hard at ordinary room temperatures (say 70°–80° Fahr.). This hydrogenation may be effected in any usual and appropriate manner, as, for instance, by subjecting the oil to the action of hydrogen, in the presence of a catalyst.

I then " granulate " the product by lowering its temperature, that is to say, chilling it to the proper grain, as is customary in the separation of palmatin, stearin and olein (using the term " olein " to refer to the liquid constituents) in the manufacture of winter oil, and I then separate the liquid constituent,—preferably by pressure, for instance, by filter-pressing.

The separated liquid constituent constitutes my improved food product. It has lost its normal cotton-seed oil characteristics and has been brought closely to the condition of a non-drying oil. It is very much less subject to oxidation than ordinary winter oil, whose iodine number is about 114—116, the iodine number of my liquid product having been reduced to about 90 and under, thereby converting it into a condition closely approximating olive oil, in so far as its keeping qualities are concerned. The product not only has a lower iodine absorption value, as above noted, but it does not respond to the well-known Halphen reaction test for cotton-seed oil, and it is of a lower specific gravity than the original refined cotton-seed oil treated. The partial hydrogenization to which it has been subjected raises the quality of the product particularly for the main edible use for which it is intended, that is to say, for use as a salad oil, and for preservation when exposed to oxidizing conditions, as will be readily understood by those skilled in the art.

The separation of the palmatin, stearin and olein (the liquid constituent), by the granulating and pressing should preferably be so complete as to give to the product the capacity to withstand the usual commercial cold test for winter oil, that is to say, the capacity to remain clear after being subjected to a temperature of 0° C., for a period of five hours.

It will be understood that the invention is not limited to the treatment of cotton-seed oil, but may also be applied to other vegetable oils, such as linseed oil, sesame oil, soya bean oil, corn oil, sun flower oil, and other so-called drying and semi-drying oils. By partially hydrogenizing any of these oils and separating the hydrogenized liquid constituent, the resulting liquid products, as in the case of cotton-seed oil treated in accordance with my invention, will have imparted to them superior keeping qualities, non-drying characteristics, and resistance to oxidation. Broadly considered, therefore, my invention extends to the treatment not only of cotton-seed oil, but of other similar drying and semi-drying oils having edible uses.

I may say, further, that the partially hydrogenized liquid product is likewise utilizable to advantage in the manufacture of while soap, particularly because, as I have found, it insures against the occurrence of brown discolorations therein.

Having thus described my invention what I claim is:—

1. The method of obtaining from vegetable oil, a liquid product of improved quality, which consists in subjecting the oil to hydrogenization, stopping the conversion at a point where the oil treated hardens at ordinary room temperatures (70°–80° Fahr.), and then separating the hydrogenized liquid constituent from the hydrogenized solid constituent.

2. The method of obtaining from vegetable oil a liquid product of improved quality, which consists in subjecting the oil to hydrogenization, stopping the conversion at a point where the oil treated hardens at ordinary room temperatures (70°-80° Fahr.), and then separating the hydrogenized liquid constituent from the hydrogenized solid constituent by granulation and pressure.

3. A liquid food product, consisting of the liquid constituent obtained by chilling and pressing an edible vegetable oil hydrogenized up to the point where it hardens at ordinary room temperature (70°-80° Fahr.) said liquid food product having an iodin number not substantially greater than 90 and having the quality of remaining clear for at least 5 hours at a temperature of 0° C.

In testimony whereof I affix my signature, in presence of two witnesses.

JAMES BOYCE.

Witnesses:
M. A. BILL,
JOHN C. PENNIE.